United States Patent [19]

Chung et al.

[11] Patent Number: 5,356,960
[45] Date of Patent: Oct. 18, 1994

[54] CATHODIC ELECTROCOATING COMPOSITIONS CONTAINING AN ANTICRATER AGENT

[75] Inventors: Ding Y. Chung, Rochester Hills; Allisa Gam, Troy, both of Mich.

[73] Assignee: E. I. Du Pont de Nemours and Company, Wilmington, Del.

[21] Appl. No.: 104,692

[22] Filed: Aug. 11, 1993

[51] Int. Cl.$^5$ .................. C08G 59/50; C08L 63/00; C25D 13/06
[52] U.S. Cl. .................. 523/404; 523/415; 523/421; 523/425
[58] Field of Search ............ 523/404, 415, 421, 425

[56] References Cited

U.S. PATENT DOCUMENTS

| | | | |
|---|---|---|---|
| 3,252,825 | 5/1966 | Marzocchi et al. | 528/27 |
| 4,423,166 | 12/1983 | Moriarity et al. | 523/415 |
| 4,988,778 | 1/1991 | Chang et al. | 525/474 |
| 5,017,632 | 5/1991 | Bredow et al. | 523/400 |
| 5,039,385 | 8/1991 | Tominaga | 204/181.7 |
| 5,069,767 | 12/1991 | Tominaga | 204/181.7 |
| 5,096,556 | 3/1992 | Corrigan et al. | 523/403 |
| 5,162,060 | 11/1992 | Bredow et al. | 106/808 |

FOREIGN PATENT DOCUMENTS

| | | |
|---|---|---|
| 56-095957 | 8/1981 | Japan . |
| 59020659-A | 6/1986 | Japan . |
| 02001774-A | 1/1990 | Japan . |
| 825556-B | 4/1981 | U.S.S.R. . |

*Primary Examiner*—Frederick Krass
*Attorney, Agent, or Firm*—Hilmar L. Fricke

[57] ABSTRACT

An improved aqueous electrocoating composition that contains an anticrater agent which is a reaction product of poly epoxy hydroxy ether resin, polyoxyalkylene diamine and an amino, glycidyl or isocyanate functional alkyl alkoxy silane having a number average molecular weight of about 1,000–6,000; electrodeposited finishes are formed that have a significant reduction in craters and are smooth and even finishes.

12 Claims, No Drawings

CATHODIC ELECTROCOATING COMPOSITIONS CONTAINING AN ANTICRATER AGENT

BACKGROUND OF THE INVENTION

This invention is directed to a cathodic electrocoating composition and in particular to a cathodic electrocoating composition containing an anticrater agent which significantly reduces craters and improves the smoothness of an electrodeposited film of the composition.

The coating of electrically conductive substrates by an electrodeposition process also called an electrocoating process (is a well known and important industrial process. Electrodeposition of primers to automotive substrates is widely used in the automotive industry. In this process, a conductive article, such as an autobody or an auto part, is immersed in a bath of a coating composition of an aqueous emulsion of film forming polymer and acts as an electrode in the electrodeposition process. An electric current is passed between the article and a counter-electrode in electrical contact with the aqueous emulsion, until a desired coating is deposited on the article. In a cathodic electrocoating process, the article to be coated is the cathode and the counter-electrode is the anode.

Resin compositions used in the bath of a typical cathodic electrodeposition process also are well known in the art. These resins typically are made from polyepoxide resins which have been chain extended and then an adduct is formed to include amine groups in the resin. Amine groups typically are introduced through reaction of the resin with an amine compound. These resins are blended with a crosslinking agent and then neutralized with an acid to form a water emulsion which is usually referred to as a principal emulsion.

The principal emulsion is combined with a pigment paste, coalescent solvents, water, and other additives to form the electrocoating bath. The electrocoating bath is placed in an insulated tank containing the anode. The article to be coated is the cathode and is passed through the tank containing the electrodeposition bath. The thickness of the coating that is deposited on the article being electrocoated is a function of the bath characteristics, the electrical operating characteristics, the immersion time, and the like.

The resulting coated article is removed from the bath after a set period of time and is rinsed with deionized water. The coating on the article is cured typically in an oven at sufficient temperature to produce a crosslinked finish on the article.

Cathodic electrocoating compositions, resin compositions, coating baths and cathodic electrodeposition processes are disclosed in Jarabek et al U.S. Pat. No. 3,922,253 issued Nov. 25, 1975; Wismer et al U.S. Pat. No. 4,419,467 issued Dec. 6, 1983; Belanger U.S. Pat. No. 4,137,140 issued Jan. 30, 1979 and Wismer et al U.S. Pat. No. 4,468,307 issued Aug. 25, 1984.

A continuing problem with cathodic electrocoating compositions has been the presence of craters in the cured finish. An additive or agent is needed for electrocoating compositions so that crater-free, smooth and even finishes are formed on electrodeposition and curing. The additive should not adversely affect such things as the throwing power of the electrocoating bath, the curing of the deposited coating or the film properties of the resulting finish.

SUMMARY OF THE INVENTION

An improved aqueous cathodic electrocoating composition having a binder of an epoxy-amine adduct and a blocked polyisocyanate crosslinking agent; wherein the improvement is the use of an anticrater agent which is a reaction product of poly epoxy hydroxy ether resin, polyoxyalkylene diamine and an amino, glycidyl or isocyanate functional alkyl alkoxy silane having a number average molecular weight of about 1,000–6,000 determined by Gel Permeation Chromatography (GPC) using polystyrene as the standard.

DETAILED DESCRIPTION OF THE INVENTION

The anticrater agent is readily incorporated into the electrocoating composition since it is compatible with the other constituents of the composition. The anticrater agent remains stable in the composition and in the electrocoating bath for extended periods of time under conventional bath operating conditions since it is not reactive with the other constituents in the composition. The anticrater agent significantly reduces and often eliminates craters in electrodeposited coatings and forms smooth and even finishes and the additive does not adversely affect other properties of the electrocoating bath or finishes of the electrocoating composition.

The anticrater additive is used in an electrocoating composition in a sufficient amount to significantly reduce or eliminate cratering in the electrodeposited finish. Generally, the anticrater agent is used in the electrocoating composition at a level of at least 0.5 % by weight, based on the total weight of binder solids in the electrocoating composition and preferably, it is used at a level of about 0.5–10% by weight. More preferably, about 1–5% by weight of the anticrater agent is used. The binder of the electrocoating composition is a blend of an epoxy amine adduct and a blocked polyisocyanate crosslinking agent.

The anticrater agent is prepared by reacting a poly epoxy hydroxy ether resin, polyoxyalkylene diamine and the functional alkyl alkoxysilane at a temperature of about 70 to 130° C. for about 1 to 5 hours to form a product having a number average molecular weight of about 1,000–6,000, preferably 2500–3500 determined as described above. Preferably the above constituents are reacted in a molar ratio of about 3:3:1.

The poly epoxy hydroxy ether resin used to form the anticrater agent has a 1,2-epoxy equivalency of about two or more, that is, polyepoxides which have on an average basis two or more epoxy groups per molecule. The preferred polyepoxides are polyglycidyl ethers of cyclic polyols. Particularly preferred are polyglycidyl ethers of cyclic polyols. Particularly preferred are polyglycidyl ethers of polyhydric phenols such as bisphenol A. These polyepoxides can be produced by etherification of polyhydric phenols with epihalohydrin or dihalohydrin such as epichlorohydrin or dichlorohydrin in the presence of alkali. Examples of polyhydric phenols are 2,bis-(4-hydroxyphenyl)ethane, 2-methyl-1,1-bis-(4-hydroxyphenyl)ethane, 2-methyl-1,1-bis-(4-hydroxyphenyl)propane, 2,2-bis(4-hydroxy-3-tertiarybutylphenyl)propane, 1,1-bis-(4-hydroxyphenol)ethane, bis-(2-hydroxynaphthyl)methane, 1,5-dihydroxy-3-naphthalene or the like.

Besides polyhydric phenols, other cyclic polyols can be used in preparing the polyglycidyl ethers of cyclic polyol derivatives. Examples of other cyclic polyols would be alicyclic polyols, particularly cycloaliphatic polyols, such as 1,2-bis(hydroxymethyl)cyclohexane, 1,3 bis-(hydroxymethyl)cyclohexane, 1,2 cyclohexane diol, 1.4, cyclohexane diol and hydrogenated bisphenol A.

The polyepoxides have molecular weights of at least 200 and preferably within the range of 200 to 3000, and more preferably about 340 to 2000.

The polyepoxides can be chain extended with a polyether or a polyester polyol which enhances flow and coalescence. Typical useful chain extenders are polyols such as polycaprolactone diols such as Tone 200 ® series available from Union Carbide Corporation and ethyoxylated Bisphenol A such as SYNFAC 8009 ® available from Milliken Chemical Company.

Examples of polyether polyols and conditions for chain extension are disclosed in U.S. Pat. No. 4,468,307. Examples of polyester polyols for chain extension are disclosed in Marchetti et al U.S. Pat. No. 4,148,772 issued Apr. 10, 1979.

The polyoxyalkylene diamine used to form the anticrater agent preferably is polyoxypropylene diamine having number average molecular weight of about 230-3000, preperably 1500-2500, such as Jeffamine D-2000 ® having a number average molecular weight of about 2000 available from Texaco Chemical Company. Another polyoxyalkylene diamine that can be used is polyoxyethylene diamine.

Typically useful amino functional alkyl alkoxy silanes are 3amino propyl triethoxy silane, gamma-amino propyl trimethoxy silane, gamma-amino propyl tripropoxy silane, N-beta(amino ethanol)-gamma amino propyl trimethoxy silane and the like. 3-Aminopropyl trimethoxy silane is preferred to form an excellent anticrater agent. Useful glycidyl functional alkyl alkoxy silanes are beta-(3,4-epoxycyclohexyl)ethyl trimethoxy silane and gamma-glycidoxypropyl trimethoxy silane. Useful isocyanate functional alkyl alkoxy silanes are isocyanato functional silanes for example having the formula $O=C=N(CH_2)_3Si(OC_2H_5)_3$.

The anticrater agent can be added to the electrocoating composition at almost any time. It can be added to the principal emulsion, to the bath or to the pigment paste. In the pigment paste, pigment is ground with a resin which can be the anticrater agent which also functions as a pigment dispersing resin.

Most principal emulsions used in an electrocoating composition comprise an aqueous emulsion of a binder of an epoxy amine adduct blended with a crosslinking agent which has been neutralized with an acid to form a water soluble product.

The anticrater agent is potentially usable with a variety of different cathodic electrocoat resins, but the preferred resin is the typical epoxy-amine adduct of the prior art. These resins are generally disclosed in U.S. Pat. No. 4,419,467 which is incorporated by reference.

Typical acids used to neutralize the epoxy-amine adduct to form water dispersible cationic groups are lactic acid, acetic acid, formic acid, sulfamic acid and the like.

Preferred crosslinkers for the above resins are also well known in the prior art. These are aliphatic, cycloaliphatic and aromatic isocyanates such as hexamethylene diisocyanate, cyclohexamethylene diisocyanate, toluene diisocyanate, methylene diphenyl diisocyanate and the like. These isocyanates are pre-reacted with a blocking agent such as oximes, alcohols, or caprolactams which block the isocyanate functionality, i.e., the crosslinking functionality. Upon heating the blocking agents separate, thereby providing a reactive isocyanate group and crosslinking occurs. Isocyanate crosslinkers and blocking agents are well known in the prior art and also are disclosed in the aforementioned U.S. Pat. No. 4,419,467.

The cathodic binder of the epoxy amine adduct and the blocked isocyanate are the principal resinous ingredients in the electrocoating composition and are usually present in amounts of about 30 to 50% by weight of solids of the composition. To form an electrocoating bath, the solids are generally reduced with an aqueous medium.

Besides the binder resin described above, the electrocoating composition usually contains pigment which is incorporated into the composition in the form of a pigment paste. The pigment paste is prepared by grinding or dispersing a pigment into a grinding vehicle and optional ingredients such as wetting agents, surfactants, and defoamers. Any of the pigment grinding vehicles that are well known in the art can be used or the anticrater agent of this invention can be used. After grinding, the particle size of the pigment should be as small as practical, generally, the particle size is about 6-8 using a Hegman grinding gauge.

Pigments which can be used in this invention include titanium dioxide, basic lead silicate, strontium chromate, carbon black, iron oxide, clay and the like. Pigments with high surface areas and oil absorbencies should be used judiciously because these can have an undesirable affect on coalescence and flow of the electrodeposited coating.

The pigment to binder weight ratio is also important and should be preferably less than 0.5:1, more preferably less than 0.4:1, and usually about 0.2 to 0.4:1. Higher pigment to binder weight ratios have been found to adversely affect coalescence and flow.

The coating compositions of the invention can contain optional ingredients such as wetting agents, surfactants, defoamers and the like. Examples of surfactants and wetting agents include alkyl imidazolines such as those available from Ciba-Geigy Industrial Chemicals as "Amine C", acetylenic alcohols available from Air Products and Chemicals as "Surfynol 104". These optional ingredients, when present, constitute from about 0.1 to 20 percent by weight of binder solids of the composition.

Optionally, plasticizers can be used to promote flow. Examples of useful plasticizers are high boiling water immiscible materials such as ethylene or propylene oxide adducts of nonyl phenols or bisphenol A. Plasticizers are usually used at levels of about 0.1 to 15 percent by weight resin solids.

The electrocoating composition of this invention is an aqueous dispersion. The term "dispersion" as used within the context of this invention is believed to be a two-phase translucent or opaque aqueous resinous binder system in which the binder is in the dispersed phase and water the continuous phase. The average particle size diameter of the binder phase is about 0.1 to 10 microns, preferably, less than 5 microns. The concentrations of the binder in the aqueous medium in general is not critical, but ordinarily the major portion of the aqueous dispersion is water. The aqueous dispersion usually contains from about 3 to 50 percent preferably 5 to 40 percent by weight binder solids. Aqueous binder concentrates which are to be further diluted with water when added to an electrocoating bath, generally have a range of binder solids of 10 to 30 percent weight.

The following example illustrates the invention. All parts and percentages are on a weight basis unless otherwise indicated.

EXAMPLE

Preparation of Anticrater Agent of Amino Silane Epoxy Polyoxypropylene Diamine Adduct The following ingredients were charged into a suitable reaction vessel equipped with a stirrer and a heating source: 2000 parts Jeffamine D2000 ® (polyoxypropylene diamine having a number average molecular weight of 2000); 66 parts 3-amino propyl triethoxysilane; 376 parts Epon 828 ® (Epoxy resin of diglycidyl ether of hisphenol A having an epoxy equivalent weight of 188). The resulting reaction mixture was heated to 104° C. under nitrogen blanket and held at this temperature for 5 hours. The anticrater agent was then dispersed by mixing in an aqueous medium of 65 parts acetic acid and 4542 parts deionized water. The resulting anticrater agent solution had a nonvolatile content of 35%.

Preparation of Chain Extended Polyepoxide Solution

The following ingredients were charged into a suitable reaction vessel: 1478 parts Epon 828 ® (described above); 427 parts hisphenol A; 533 parts ethoxylated hisphenol A having a hydroxy equivalent weight of 247 (Synfac 8009 ® from Milliken Company) and 121 parts xylene. The resulting reaction mixture was heated to 160° C. under nitrogen blanket and held at this temperature for 1 hour. 5.1 parts dimethyl benzyl amine were added and the mixture was held at 147° C. until an epoxy equivalent weight of 1050 was obtained. The reaction mixture was cooled to 98° C. and 168 parts of diketimine (reaction product of diethylenetriamine and methyl isobutyl ketone at 72.7% solids) and 143 parts of methyl ethanol amine were added. The resulting mixture was held at 120° C. for 1 hour and then 727 parts of methyl isobutyl ketone were added. The resulting resin solution had a nonvolatile content of 75%.

Preparation of Crosslinking Resin Solution

An alcohol blocked polyisocyanate crosslinking resin solution was prepared by charging 1840 parts of Isonate 181 ® (methylene diphenyl diisocyanate) and 786.3 parts of methyl isobutyl ketone into a suitable reaction vessel and heated to 37° C. under a dry nitrogen blanket and 0.3 parts of dibutyl tin dilaurate were added. A mixture of 1093 parts of methanol, 156.2 parts ethanol and 515.5 parts of diethylene glycol monobutyl ether was slowing charged into the reaction vessel while maintaining the reaction mixture below 93° C. The resulting reaction mixture was held at 93° C. for an additional hour until essentially all of the isocyanate was reacted as indicated by infrared scan of the reaction mixture. 87.4 parts of butanol was added. The resulting resin solution had a nonvolatile content of 75%.

Preparation of Quaternizing Agent

The quaternizing agent was prepared by adding 87 parts dimethylethanolamine to 320 parts ethylhexanol half-capped toluene diisocyanate in the reaction vessel at room temperature. An exothermic reaction occurred and the reaction mixture was stirred for one hour at 80° C. 118 parts aqueous lactic acid solution (75% nonvolatile) was then added followed by the addition of 39 parts 2-butoxyethanol. The reaction mixture was held for about one hour at 65° C. with constant stirring to form the quaternizing agent.

Preparation of Pigment Grinding Vehicle

The pigment grinding vehicle was prepared by charging 710 parts Epon 829 ® (diglycidyl ether of hisphenol A having an epoxide equivalent weight of 193–203) and 290 parts bisphenol A into a suitable vessel under nitrogen blanket and heated to 150°–160° C. to initiate an exothermic reaction. The exothermic reaction was continued for about one hour at 150°–160° C. The reaction mixture was then cooled to 120° C. and 496 parts of 2-ethylhexanol half-capped toluene diisocyanate was added. The temperature of the reaction mixture was held at 110°–120° C. for one hour, followed by the addition of 1095 parts of 2-butoxyethanol, the reaction mixture was then cooled to 85°–90° C., and then 71 parts of aleionized water was added followed by the addition of 496 parts quaternizing agent (prepared above). The temperature of the reaction mixture was held at 85°–90° C. until an acid value of about 1 was obtained.

Preparation of Pigment Paste A

| | Parts by Weight |
| --- | --- |
| Anticrater Agent (prepared above) | 337 |
| Acetic Acid | 5 |
| Deionized Water | 276 |
| Titanium Dioxide Pigment | 267 |
| Aluminum Silicate Pigment | 53 |
| Lead Silicate Pigment | 23 |
| Carbon Black Pigment | 8 |
| Dibutyl Tin Oxide | 31 |
| Total | 1000 |

The above ingredients were mixed until homogenous in a suitable mixing container. They were then dispersed in a sandmill until Hegman reading seven or greater is obtained. The nonvolatile of the paste is 50%.

Preparation of Pigment Paste B

| | Parts by Weight |
| --- | --- |
| Pigment Grinding Vehicle (prepared above) | 203 |
| Deionized Water | 415 |
| Titanium Dioxide Pigment | 267 |
| Aluminum Silicate Pigment | 53 |
| Lead Silicate Pigment | 23 |
| Carbon Black Pigment | 8 |
| Dibutyl Tin Oxide | 31 |
| Total | 1000 |

The above ingredients were mixed until homogenous in a suitable mixing container. They were then dispersed in a sandmill until a hegman reading of seven or greater is obtained. The nonvolatile of the paste is 50%.

Preparation of Emulsion

| | Parts by Weight |
| --- | --- |
| Chain Extended Polyepoxide Solution (prepared above) | 553 |
| Crosslinking Resin Solution (prepared above) | 319 |
| Surfactant* | 6 |
| Lactic Acid | 12 |

-continued

Preparation of Emulsion

| | Parts by Weight |
|---|---|
| Deionized Water | 871 |
| Total | 1761 |

*Surfactant is a mixture of 120 parts Amine C ® from Ciba-Geigy, 120 parts Surfynol 104 ® (acetylene alcohol) from Air Products and Chemicals Inc., 120 parts of 2-butoxy ethanol, 221 parts deionized water, and 19 parts lactic acid.

The chain extended polyepoxide solution, crosslinking resin solution, surfactant and lactic acid were thoroughly mixed. Then the deionized water was added under agitation. The emulsion nonvolatile was adjusted to 36% with the necessary amount of deionized water. The emulsion was kept agitated until the organic ketone of the crosslinking resin solution had evaporated.

Preparation of Electrocoating Bath I

| | Parts by Weight |
|---|---|
| Emulsion (prepared above) | 1553 |
| Deionized Water | 1938 |
| Pigment Paste B (prepared above) | 418 |
| Amino Silane Epoxy Polyoxypropylene diamine adduct (prepared above) | 91 |
| Total | 4000 |

A cationic electrodeposition bath was prepared by mixing the above ingredients. The bath was then ultrafiltered 25%. The bath was electrocoated at 250–270 volts to obtain 0.9–1.0 mils (22.86–25.4 microns). In order to check the crater resistance of the bath, a blowout panel for crater resistance test was assembled according to GM Engineering Standard GM9532P. The blow-out panel was coated in the above bath. After coating, the panel was rinsed, air-dried for 5 minutes and baked at about 182° C. for 10 minutes metal temperature. Crater resistance was rated according to a rating scale of 1–10 where 10 is no craters on the panel. The rating was 10.

An electrocoating bath was prepared identical to Bath I above except the amino silane epoxy polyoxypropylene diamine adduct was replaced with a conventional anti cratering agent and the crater resistance of this bath was tested as above by coating a blow out panel under the same conditions and baking the panel under the same conditions. The crater resistance rating for this panel was 5 which is substantially inferior to the panel coated in Bath I which contained the anticrater agent of this invention.

Preparation of Electrocoating Bath II

| | Parts by Weight |
|---|---|
| Emulsion (prepared above) | 1553 |
| Deionized Water | 1965 |
| Pigment Paste A (prepared above) | 482 |
| Total | 4000 |

A cationic electrodeposition bath was prepared by mixing the above ingredients. The bath was then ultrafiltered 25%. The bath was electrocoated at 250–270 volts to obtain 0.9–1.0 mils (22.86–25.4 microns). The 4"×12" (10.16×30.48 cm) panels were coated and baked at about 182° C. for 10 minutes metal temperature. The appearance of the panels was smooth.

Crater resistance was determined using the same procedure as was used above. The crater resistance rating was 10.

In order to measure edge corrosion resistance, knife blades (10 ×2 cm) were coated at 250 volts and baked at 182° C. for 10 minutes metal temperature. The knife blades were then exposed to salt spray chamber for 7 days. The number of rust spots were counted under microscope. This bath produces 5–10 rust spots.

An electrocoating bath was prepared identical to Bath II above except the amino silane epoxy polyoxypropylene diamine adduct was replaced in Pigment Paste A with a conventional anti cratering agent and the crater resistance of this bath was tested as above for crater resistance and for corrosion resistance by using the same tests and conditions as above. The crater resistance was 5 and the number of rust spots was 80–100. Both test show substantially inferior results in comparison to the composition made with the anticrater agent of this invention.

We claim:

1. An improved cathodic electrocoating composition, comprising an aqueous carrier having dispersed therein a film forming binder comprising an epoxy-amine adduct and a blocked polyisocyanate crosslinking agent; wherein the improvement consists essentially of an anticrater agent which consists essentially of a reaction product produced by reacting constituents consisting of poly epoxy hydroxy ether resin, polyoxyalkylene diamine and an alkyl alkoxy silane having an amino, glycidyl or isocyanate functional group; said constituents being reacted at 70°–130° C. for a sufficient time to form the reaction product having a number average molecular weight of about 1,000–6,000 determined by Gel Permeation Chromatography (GPC) using polystyrene as the standard; wherein the anticrater agent is used in an amount of about 0.5–10% by weight, based on the weight of the binder, to reduce craters in a coating formed from the electrocoating composition.

2. The improved cathodic electrocoating composition of claim 1 in which the poly epoxy hydroxy ether resin is a diglycidyl ether of a polyphenol extended with a polyol.

3. The improved electrocoating composition of claim 1 in which the polyoxyalkylene diamine is a polyoxypropylene diamine having a number average molecular weight of about 1500–2500.

4. The improved electrocoating composition of claim 1 in which the alkyl alkoxy silane is an amino alkyl alkoxy silane.

5. The improved electrocoating composition of claim 4 in which the silane is amino propyl triethoxy silane.

6. The improved electrocoating composition of claim 1 in which the poly epoxy hydroxy ether resin is a diglycidyl ether of a polyphenol extended with a polyol, the polyoxyalkylene diamine is polyoxypropylene diamine having a number average molecular weight of about 1500–2500 and the alkyl alkoxy silane is amino propyl triethoxy silane.

7. The improved cathodic electrocoating composition of claim 1 wherein the anticrater agent is present in an amount of about 1–5% by weight, based on the weight of the film forming binder of the composition.

8. A method of preparing a cathodic electrocoating composition comprising the following steps in any workable order:

(a) preparing an epoxy-amine adduct;

(b) preparing a blocked polyisocyanate crosslinking agent;
(c) blending the epoxy-amine adduct with the blocked polyisocyanate crosslinking agent;
(d) neutralizing the epoxy-amine adduct with an organic acid to form an emulsion;
(e) blending the emulsion with a pigment paste; and
(f) adding an anticrater agent to the electrocoating composition to improve crater resistance of the coating on electrodeposition and curing of the coating; wherein the anticrater agent consists essentially of a reaction product produced by reacting constituents consisting of poly epoxy hydroxy ether resin, polyoxyalkylene diamine and alkyl alkoxy silane having an amino, glycidyl or isocyanate group; said constituents being reacted at 70°–130° C. for a sufficient time to form the reaction product having a number average molecular weight of about 1,000–6,000 determined by Gel Permeation Chromatography (GPC) using polystyrene as the standard; wherein the anticrater agent is used in an amount of about 0.5–10% by weight, based on the weight of the binder, to reduce craters in a coating formed from the electrocoating composition.

9. The method of claim 8 in which the poly epoxy hydroxy ether resin is a glycidyl ether of a polyphenol chain extended with a polyol.

10. The method of claim 8 in which the polyoxyalkylene diamine is polyoxypropylene diamine having a number average molecular weight of about 1500–2500.

11. The method of claim 8 in which the alkyl alkoxy silane is amino alkyl alkoxy silane.

12. The method of claim 11 in which the alkyl alkoxy silane is amino propyl triethoxy silane.

* * * * *